(12) United States Patent
Hayashi et al.

(10) Patent No.: US 8,163,376 B2
(45) Date of Patent: *Apr. 24, 2012

(54) SHAPE MEMORY POLYMER COMPOSITION, FIBER REINFORCED PLASTIC AND PRODUCTION PROCESS THEREOF

(75) Inventors: Noriya Hayashi, Aichi-ken (JP);
Shunichi Hayashi, Aichi-ken (JP);
Norio Miwa, Aichi-Ken (JP);
Toshikatsu Nohara, Hiroshima-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 398 days.

This patent is subject to a terminal disclaimer.

(21) Appl. No.: 10/800,008

(22) Filed: Mar. 15, 2004

(65) Prior Publication Data

US 2004/0210027 A1    Oct. 21, 2004

(30) Foreign Application Priority Data

Apr. 1, 2003  (JP) ................................. 2003-097770

(51) Int. Cl.
*D04H 1/00* (2006.01)
*B29C 65/00* (2006.01)

(52) U.S. Cl. ............. 428/292.1; 428/299.1; 428/295.1; 428/297.4; 428/300.7; 428/301.4; 428/423.1; 156/307.1; 156/307.3; 156/307.4; 156/331.7

(58) Field of Classification Search .............. 528/65, 528/76, 85; 428/221, 292.1, 299.1, 295.1, 428/297.4, 300.7, 301.4, 423.1; 264/280; 524/494; 156/307.1, 307.3, 307.4, 331.7, 156/301.7; 521/137, 155; 525/123, 130, 525/424, 453, 454, 455

See application file for complete search history.

(56) References Cited

U.S. PATENT DOCUMENTS

| | | | | |
|---|---|---|---|---|
| 3,350,438 A * | 10/1967 | Hennig | ........................ | 560/335 |
| 3,475,803 A * | 11/1969 | Hill | ................ | 492/56 |
| 3,496,238 A * | 2/1970 | Elfers | ............... | 568/613 |
| 4,129,611 A * | 12/1978 | Heiss | ................. | 525/440 |
| 4,251,428 A * | 2/1981 | Recker et al. | ............... | 524/450 |
| 4,403,064 A * | 9/1983 | Heine | ................. | 524/494 |
| 4,547,561 A | 10/1985 | Wegner | | |
| 4,738,999 A * | 4/1988 | Blenner et al. | ................. | 524/80 |
| 4,990,545 A * | 2/1991 | Hourai et al. | ................. | 521/171 |
| 5,032,622 A * | 7/1991 | Herrington et al. | ............ | 521/99 |
| 5,071,613 A * | 12/1991 | Fukami et al. | ............... | 264/257 |
| 5,098,776 A * | 3/1992 | Kobayashi et al. | ............ | 442/104 |
| 5,135,786 A | 8/1992 | Hayashi et al. | | |
| 5,145,935 A | 9/1992 | Hayashi | | |
| 5,492,951 A * | 2/1996 | Beyrle et al. | ................. | 524/188 |
| 5,574,472 A | 11/1996 | Robinson | | |
| 6,583,194 B2 * | 6/2003 | Sendijarevic | ................. | 521/172 |
| 6,787,226 B2 * | 9/2004 | Niino et al. | ................. | 428/361 |
| 2003/0176561 A1 * | 9/2003 | Joshi et al. | ................... | 524/494 |
| 2004/0198923 A1 | 10/2004 | Hayashi et al. | | |
| 2005/0072522 A1 | 4/2005 | Hayashi et al. | | |

FOREIGN PATENT DOCUMENTS

| | | |
|---|---|---|
| EP | 1 471 089 A2 | 10/2004 |
| JP | 62-232440 A | 10/1987 |
| JP | 02-092914 A | 4/1990 |
| JP | 02-214715 A | 8/1990 |
| JP | 7-60971 B2 | 6/1995 |
| JP | 2003-137962 A | 5/2003 |
| JP | 2004-300291 A | 10/2004 |
| WO | WO-0216482 A2 * | 2/2002 |

OTHER PUBLICATIONS

Sweeney, Reaction Injection Molding, 1979, p. 74.*
Saunders et al, Polyurethanes, Part II, 1964, p. 770.*
MSDS for Millionate MR-200, Issued Nov. 5, 1986, Nippon Polyurethane Industry Co., Ltd.*
Database WPI, Section Ch, Week 199402, Derwent Publications, ltd., AN 1994-012422, XP002286816, Abstract of JP 05 320366 A, Mitsubishi Heavy Ind. Co. Ltd, Dec. 3, 1993, 2 pages.
Lin et al., "Study on Shape-Memory Behavior of Polyether-Based Polyurethanes. II. Influence of Soft-Segment Segment Molecular Weight," J. Appl. Poly. Sci., Aug. 22, 1998, 69(8):1575-1586.
Office Action mailed Apr. 16, 2009, in corresponding European Patent Application No. 04 290 824.4, two pages.

* cited by examiner

*Primary Examiner* — Milton I Cano
*Assistant Examiner* — Michael L Leonard
(74) *Attorney, Agent, or Firm* — Foley & Lardner LLP

(57) ABSTRACT

Provided are a shape memory polymer composition, which comprises a bifunctional isocyanate and/or a trifunctional isocyanate, and a polyol having an average molecular weight of from 100 to 550, with a molar ratio in terms of functional groups of isocyanate:polyol=0.9 to 1.1:1.0; FRP having the shape memory polymer and a fibrous material; and a production process of the FRP comprising impregnating the fibrous material with, as a matrix resin, the shape memory polymer composition and curing. According to the present invention, the shape memory polymer composition has an extended pot life and FRP has excellent inflatability.

10 Claims, No Drawings

SHAPE MEMORY POLYMER COMPOSITION, FIBER REINFORCED PLASTIC AND PRODUCTION PROCESS THEREOF

BACKGROUND OF THE INVENTION

1. Field of the Invention

The present invention relates to a shape memory polymer composition, a fiber reinforced plastic, and a production process thereof.

2. Background of the Invention

In order to bring materials to space and assemble a structure there, the volume of each material should be kept as small as possible for transportation. For example, a large apparatus such as a solar cell panel to be installed on an artificial satellite or a space structure must be small in size for transport from the earth. An apparatus folded during transport is expanded into a predetermined shape suitable for use in space or on a satellite orbit. The property of a material which permits downsizing for transport action and expansion or development into a predetermined shape for practical use is called "inflatability".

Inflatability is also an important property for materials used for ground-based structures. Use of an inflatable material makes compact storage (volume reduction) possible for loading on a motor lorry or the like and expansion into a predetermined shape for use at an assembly or building site.

Structures having inflatability can be classified into those making use of mechanical actions such as folding at joints, and those making use of actions based on material properties, that is, restoration into the original shape by heating.

Conventionally inflatability is often realized by means of mechanical structures such as folding at a joint. When used some forces are applied to the joint to expand the structure into a predetermined shape. Such a structure, however, has the drawback that troubles such as disorders or accidents may occur upon expansion.

Several studies have so far been made on structures having inflatability on the basis of a material property. An inflatability material must be rigid and have some strength when it is used for a large-sized structure. Preferred examples of such rigid polymer material having some strength include fiber reinforced plastics (FRPs) and carbon fiber reinforced plastics (CFRPs, which may be included in FRPs). Inflatability may be given by having a fibrous material in a shape memory polymer to form FRPs.

The term "shape memory polymer" as used herein means, among conventional polymers, a resin whose molded shape and deformed shape can be switched by temperature control using heat. A molded product obtained using this shape memory polymer may be deformed at a glass transition point (Tg) or above but below a melting point of the polymer. By cooling it to the glass transition point (Tg) or below while keeping the deformed shape, the deformed shape can be fixed, and then by heating it to the glass transition point or above but below the melting point or decomposition point of the polymer, the original molded shape is recovered. Thus, the deformed shape and the molded shape can be switched by temperature control (refer to, for example, Japanese Patent Application Laid-Open No. 5-320366).

An FRP is generally a fiber reinforced plastic having a continuous fibrous material contained therein. It has a hardness comparable to that of ceramic, has a strength equal to that of metals, weighs about one fifth of iron, and shows a modulus of elasticity about 3 to 4 times as much as that of iron. For such FRP, particularly CFRP, an increased packing density of fibers and a resin per cross-sectional area of it has conventionally been an important research problem.

The proportion of fibers determines the strength of FRP. FRP containing an increased proportion of fibers has excellent strength, but a proper amount of a resin must be added in order to mold or form the FRP into a desired shape such as plate. The resin is also necessary for adhering fibers together. FRP has various kinds, depending on the manner of weaving or twisting of fibers. For example, a cloth of about 10 cm width can be used to form an FRP and such FRP may be utilized to form plates or pipes for large-sized structures.

Upon production of such FRP, a fibrous material must be impregnated with a resin. The fibrous material can be impregnated better with a thermosetting resin than a thermoplastic resin. Since the thermosetting resin usually has a low viscosity and fibers can therefore be easily impregnated therewith, use of it enables the production of FRP having a high quality. In addition, high strength of it can be maintained. When the thermoplastic resin is used, on the other hand, the resin melted into a liquid form has a high viscosity and does not permit smooth impregnation among fibers. In this case, FRP with many voids or defects may result.

When FRP is produced in a conventional manner by using a thermosetting resin having memory shape properties, a two-part curing type resin, for example, may quickly cure upon mixing, and time necessary for impregnation and other operations (pot life) tends to be insufficient.

SUMMARY OF THE INVENTION

In light of the above-described problems, the present inventors have carried out an extensive investigation with a view toward developing a thermosetting resin having shape memory properties and having an extended pot life, and at the same time, developing a fiber reinforced plastic having excellent inflatability.

As a result, it has been found that such problems can be overcome by a shape memory polymer composition containing not a chain extender which is conventionally an essential component for shape memory polymers but an isocyanate component and a predetermined polyol component; and a fiber reinforced plastic available by impregnating a fibrous material with the composition, leading to the completion of the present invention.

In one aspect of the present invention, there is thus provided a shape memory polymer composition which comprises an isocyanate which is bifunctional or trifunctional or a mixture of bifunctional and trifunctional isocyanates and a polyol having an average molecular weight of 100 to 550 with a molar ratio, in terms of functional groups of isocyanate:polyol=0.9 to 1.1:1.0.

In order to allow the polymer composition to exhibit an inflatable function in the space environment, it is desired to adjust the glass transition point (Tg) of the polymer composition usually between 40 and 150° C., preferably between 70 and 120° C., because shape memory properties such as shape fixity and shape recovery can be exhibited at such a temperature. An increase in Tg, however, shortens the pot life. Accordingly, it is a technical problem to attain both higher Tg (for example, about 95° C.) and adequate pot life.

In the present invention, it is possible to have an adequate pot life necessary for molding or forming of FRP by omitting a chain extender from the components which are conventionally considered essential. The omission of the chain extender lowers the Tg of the resulting polymer. But, surprisingly, a polymer composition having a sufficient pot life and having a Tg that exhibits shape memory properties such as shape fixity and shape recovery is available by using a low-molecular-weight polyol and incorporating an isocyanate and polyol at the above-described ratio.

The above-described polyol preferably contains polypropylene glycol in an amount of 50 wt. % or greater. Another polyol component is preferably ether based and free from hydrolysis, and at the same time it is aromatic or aliphatic side-chain based and capable of having an increased Tg from the viewpoint of its molecular design. The polyol is preferably bifunctional.

In another aspect of the present invention, there is also provided a fiber reinforced plastic comprising the above-described shape memory composition and a fibrous material. The fiber reinforced fabric preferably contains 25 to 95 vol. % of the shape memory polymer composition and 5 to 75 vol. % of the fibrous material.

Since the fiber reinforced plastic (FRP) according to the present invention is, while containing the fibrous material therein, compressed and fixed by the resin composition which is a shape memory polymer, it has inflatability, and it can take a second shape when heat is applied to it. By properly using at least two shapes and physical properties of these shapes, the FRP of the present invention can be applied to a variety of uses. Particularly when the glass transition point of the polymer is set near room temperature, FRP can readily be fixed to a deformed shape, developed and expanded at any time.

In a further aspect of the present invention, there is also provided a production process of a fiber reinforced plastic, which comprises preparing a shape memory polymer composition having a liquid bifunctional isocynate and/or a liquid trifunctional isocyanate and a polyol having an average molecular weight of from 100 to 550 at a molar ratio, as a functional group, of isocyanate:polyol=0.9 to 1.1:1.0; impregnating a fibrous material with a matrix resin of the composition; and then curing the impregnated fibrous material.

The above-described polyol preferably contains polypropylene glycol in an amount of 50 wt. % or greater. Another polyol component of the composition is preferably ether-based and free of hydrolysis, and at the same time, it is aromatic or aliphatic side-chain-based and capable of having an increased Tg from the viewpoint of molecular design. The polyol is preferably bifunctional. It is also preferred to stack at least two layers of the impregnated fibrous material one after another, make them stick each other closely, apply pressure thereto and cure as a multilayer laminate.

As descried above, the present invention makes it possible to provide a thermosetting polymer composition having an extended pot life and having shape memory properties; a fiber reinforced plastic having excellent inflatability; and a production process thereof. Described specifically, since the polymer composition of the present invention has an initial impregnation property and a pot life of at least a predetermined time, it is possible to sufficiently impregnate a fibrous material with the polymer composition upon production of FRP. This facilitates the production of FRP molding products having both sufficient strength and inflatability. The FRP molding products can be deformed into a predetermined shape and they can recover their original shape by a simple heating operation.

DETAILED DESCRIPTION OF THE INVENTION

The shape memory polymer composition according to the present invention, a fiber reinforced plastic produced using the composition and a production process of the fiber reinforced plastic will next be described.

(Shape Memory Polymer Composition)

The shape memory polymer composition according to the present invention will next be described. The shape memory polymer composition of the present invention has a bifunctional isocyanate and/or a trifunctional isocyanate, a polyol having an average molecular weight of 100 to 550, with a molar ratio in terms of functional groups of isocyanate:polyol=0.9 to 1.1:1.0.

The polymer composition to be used for FRP is required to have, as its properties, a good initial impregnation property in order to impregnate a fibrous material sufficiently and at the same time, a pot life of a predetermined length or longer. The polymer composition has preferably a viscosity of 1000 cps or less as determined by the viscoelasteic measurement in consideration of the impregnation of reinforced fibers with it. Its pot life is preferably 30 minutes or longer, more preferably 60 minutes or greater in order to prepare a dense FRP molding product while maintaining a sufficient impregnation time for the fibrous material. The pot life here means a rise time necessary for the polymer composition to attain a viscosity of, for example, about 1000 cps.

Moreover, in order to allow the molded FRP to exhibit an inflatable function, the Tg of the polymer composition is usually from 40 to 150° C., preferably from about 70 to 120° C. from the viewpoint of keeping its shape memory properties.

The shape memory polymer composition of the present invention sufficiently satisfies the above-described conditions. It can attain both a higher value of Tg (for example, about 95° C.) and an adequate pot life (for example, about 50 minutes). The shape memory polymer composition of the present invention has properties suitable for FRP, but it can be used for other purposes.

Examples of the raw materials which can be used for the shape memory composition of the present invention will next be described, but not limited to them.

Examples of the bifunctional isocyanate include those represented by the formula: OCN—R—NCO. In this formula, R represents a group having 0, 1 or 2 benzene rings, but any of these can be used. Specific examples include 2,4-tolylene diisocyanate, 4,4'-diphenylmethane diisocyanate, and hexamethylene diisocyanate.

Examples of the trifunctional isocyanate include carbodiimide-modified 4,4'-diphenylmethane diisocyanate (carbodiimide-modified MDI) represented by the below-described formula. A mixture of the bifunctional isocyanate and trifunctional isocyanate can also be used. In order to provide the polymer composition as a two-part curing type resin suitable for the formation of FRP, the isocyanate is preferably in the liquid form at normal temperature.

[Chemical Formula 1]

As the polyol, those having an average molecular weight of 100 to 550 are used. When the molecular weight of the polyol exceeds 550, the resulting shape-memory polymer has an increased pot life, but because Tg becomes low, it becomes difficult to maintain the Tg of the polymer composition at 40° C. or higher and the shape memory properties such as shape fixity and shape recovery may not be realized in the space environment. When the average molecular weight is less than 100, on the other hand, the pot life becomes inadequately short for the molding or forming of FRP. The average molecular weight of the polyol is preferably from 150 to 250. The term "average molecular weight" as used herein means a weight-average molecular weight as measured by gel permeation chromatography (GPC).

As the polyol for the present invention, a bifunctional polyol is preferred to see physical properties (for example, modulus of elasticity) change considerably around Tg. Examples of the bifunctional polyol include those represented by the formula: HO—R'—OH, in which R' has 0, 1 or 2 benzene rings; and products obtained by reacting the above-described bifunctional polyol with a bifunctional carboxylic acid or cyclic ether. Specific examples include polypropylene glycol, 1,4-butaneglycol adipate, polytetramethylene glycol, polyethylene glycol and bisphenol-A+propylene oxide.

In the present invention, among the above-described polyols, ether-based polyols which are free of hydrolysis. At the same time, the polyols should be aromatic or aliphatic sidechain based and capable of having an increased Tg from the viewpoint of molecular design. Of the above-described compounds, polypropylene glycol is particularly preferred. It is usually contained in an amount of 50 wt. % or greater, preferably 70 wt. % or greater, more preferably 90 wt. % or greater, as a monomer in the polyol components.

The isocyanate and polyol are mixed with a molar ratio of the functional groups of 0.9 to 1.1:1.0 (isocyanate:polyol, which means NCO/OH=0.9 to 1.1). A polymer composition available by mixing at such a ratio has a high Tg and is capable of exhibiting shape memory properties such as shape fixity and shape recovery while maintaining a necessary pot life. The above-described mixing ratio can also be expressed as a molar ratio of the functional groups:isocyanate:polyol=0.95 to 1.05:0.95 to 1.05. A preferred mixing ratio is, as a molar ratio of the functional groups, isocyanate:polyol=0.98 to 1.05:1.0 (NCO/OH=0.98 to 1.05).

The shape memory polymer composition of the present invention does not contain a chain extender which is conventionally an essential component. The chain extender serves as a Tg regulator in the polymer composition and is used for maintaining a high Tg, but it tends to shorten the pot life. In the present invention, a polymer composition having a high Tg can be provided without using such a chain extender.

As an additive to be used within a range not disturbing curing of the polymer composition of the present invention, at least one of ordinarily employed additives such as fillers, organic components and diluents can be added.

(Fiber Reinforced Plastic and Production Process Thereof)

The fiber reinforced plastic according to the present invention will next be described specifically. It comprises the above-described shape memory polymer composition and a fibrous material.

The fibrous material is not limited to fibers made of an organic material, but inorganic fibers such as glass fibers, and carbon fibers can be used. More specifically, carbon fibers and aramide fibers are suited. The weave is not limited and, for example, a plain weave fabric made of warp and weft threads can be used. The fibrous material having a thickness, for example, ranging from 0.1 to 1.0 mm can be used.

The fiber reinforced plastic of the present invention may contain, in addition to the above-described polymer composition serving as a matrix resin and the fibrous material, reinforcing fibers and colorants. Their proportion is not particularly limited.

Although there is no particular limitation imposed on the percentage composition of the polymer composition and fibrous material, the volume content of the fibrous material usually ranges from 5 to 75 vol. %, preferably from 10 to 60 vol. %, more preferably from 20 to 55 vol. %. The theoretical volume of the fibrous material in the FRP can be calculated by dividing the weight of the fibrous material per unit area, in which the number of the stacked layers has been taken into consideration, by the density of the fibrous material. The volume content of the fibrous material less than 5 vol. % is not preferred, because the fibrous material cannot sufficiently play a role of reinforcing plastic. The volume content of the fibrous material exceeding 75 vol. %, on the other hand, impairs moldability or formability and prevents sufficient impregnation of the fibrous material with the resin, making it difficult to obtain a non-defective product. In addition, when the volume content of the fibrous material exceeds 60 vol. %, the inflatability is not brought by the resin composition fully. Within the volume content of the above range, an increase in the composition ratio of the fibrous material heightens the strength of the resulting molded product, while an increase in the resin content improves shape fixity.

A production process of the fiber reinforced plastic according to the present invention will next be described.

As a desirable production process of fiber reinforced plastic, vacuum RTM can be adopted. In this process, after disposal of a fibrous material in a mold, the mold is evacuated by vacuum suction. Components of the polymer composition are mixed in advance in a container and the resulting mixture is poured in the mold to impregnate the fibrous material with the polymer composition. The impregnation time is determined freely, depending on the composition of the polymer or kinds of the fibrous material. The polymer composition of the present invention, however, has a pot life of 30 minutes or greater so that impregnation is conducted for a period time which is within this pot life and permits sufficient penetration of the resin into the fibers. After the impregnation, the composition is cured while maintaining a vacuum condition. After curing, the FRP is released from the mold. The polymer composition is cured under any condition while taking in consideration the curing temperature of the composition (for example, 80° C.×1 hr+120° C.×2 hrs). If necessary, after release from the mold, the composition may be post cured (for example, at 150° C.×4 hr).

A hot press molding can also be adopted as the production process of a fiber reinforced plastic. In this method, materials may be poured in a resin tank and then, mixed; or prior to pouring in a resin tank, the materials are mixed in advance in another container. In the resin tank, the fibrous material is charged to impregnate it with the above-described mixture. In the curing step of the FRP after the impregnation, it is preferred to gradually raise the temperature while giving a complete shape to the fibrous material impregnated with the resin and applying considerable pressure thereto. A drastic temperature rise happens to produce a crude FRP molding product, because it disturbs dense packing of the fibers. Accordingly, deliberate temperature control such as gradual temperature rise is desired for producing a high density FRP.

The impregnation can also be conducted by taking the fibrous material off as a cloth, mat, tape or the like and then directing it through a resin tank filled with the polymer composition. As an alternative to the impregnation in the resin tank, a method of spraying the polymer composition downward or upward to the fibrous material can also be adopted as needed.

A laminate having a multilayer structure is formed by stacking at least two layers of the impregnated fibrous material prior to pressing and making them stick each other closely. After stacking and adjusting its thickness, the resulting fibrous material such as plural layers of a cloth is caused to pass through a pressurizing mechanism and then, cured. If necessary, a plurality of the curing steps may be performed successively.

Upon curing, the temperature is usually increased to 60 to 180° C. suited for hot pressing. The pressure is usually about 0 to 20 kgf/cm$^2$.

After curing, post curing can be performed in order to control the temperature and release the thermal strain. Upon this post curing, heat greater than that upon molding is preferably applied. Then, after a cutting step, the resulting molding piece is examined.

The modes for carrying out the present invention were so far described. It should however be borne in mind that the present invention is not limited thereto but can be modified within an extent not departing from the scope of the present invention. The present invention will hereinafter be described in further detail by examples, but the present invention is not limited by them.

EXAMPLES

Example 1

A two-part curing type polyurethane resin, which was a shape memory polymer composition, was prepared and it was tested for its properties. As a liquid isocyanate having an NCO group, a mixture of 4,4'-diphenylmethane diisocyanate (MDI) and carbodiimide-modified 4,4'-diphenylmethane diisocyanate (carbodiimide-modified MDI) was employed, while as a polyol (long chain) having an OH group, polypropylene glycol having a molecular weight of 200 (PPG200) or polypropylene glycol having a molecular weight of 400 (PPG400) was employed. A mixing ratio of these components is shown in Table 1 (Sample 1 and Sample 2).

As a comparative example, a composition obtained by adding, to the composition of Sample 2, 1,4-butanediol (1,4BG) as a chain extender was prepared (Sample 3).

TABLE 1

| Sample No. | Isocyanate | Polyol | Chain extender | Mixing ratio [molar ratio of functional group: NCO/OH/OH] |
|---|---|---|---|---|
| 1 | Mixture of MDI and carbodiimide-modified MDI | PPG200 | — | 1.05/1.0/– |
| 2 | Mixture of MDI and carbodiimide-modified MDI | PPG400 | — | 1.05/1.0/– |
| 3 | Mixture of MDI and carbodiimide-modified MDI | PPG400 | 1,4BG | 1.575/1.0/0.5 |

Then, the pot life of each of the above-described three polymer compositions was determined by measuring a time-dependent change of a solution viscosity after the two parts were mixed under the conditions of 25° C., and scale of 200 g. When the isocyanate component (base resin) and polyol component (curing agent) are mixed, reaction and curing of them occurs, by which they become a resin. In addition, the Tg of the cured product was determined by the measurement of a dynamic viscoelasticity. The pot life and Tg of each of Samples 1 to 3 are shown in Table 2.

TABLE 2

| Sample No. | Pot life [min] | Tg [° C.] |
|---|---|---|
| 1 | approx. 50 | 95.3 |
| 2 | approx. 150 | 42.8 |
| 3 | approx. 20 | 57.3 |

As shown in Table 2, Sample 1 and Sample 2 each exhibited low reactivity. Sample 1 and Sample 2 maintained a low viscosity state for about 50 minutes and about 150 minutes, respectively. Sample 3 added with a chain extender, on the other hand, exhibited high reactivity. Its rise in solution viscosity was rapid and it was cured in about 20 minutes. As a result of the measurement of a dynamic viscoelasticity, any one of Samples 1 to 3 underwent a large change in the modulus of elasticity (Pa) within a temperature range of from 40 to 100° C. In particular, it was confirmed that Sample 1 had a Tg as high as 95.3° C.

Example 2

In this Example, the FRP of the present invention was produced and evaluated. The composition of Sample 1 was employed as a matrix resin, while a sample (TP2) made of two pieces of carbon fiber cloth (CF cloth) and a sample (TP3) made of three pieces of CF cloth were made as a fibrous material.

The FRP was molded by the vacuum RTM. First, the CF cloth was cut and the resulting piece was disposed in a mold for molding a plate of about 1 mm thick. Then, the mold was evacuated by vacuum suction. After evacuation of the base resin and curing agent of the polymer composition at 60° C. for about 2 hours, they were cooled to room temperature. They were then stirred and mixed at a molar ratio, as a functional group, of isocyanate:polyol=1.05:1.0, by which the white turbid reaction mixture became transparent in about 2 minutes. The transparent resin component was poured in the mold after defoaming and under vacuum, they were cured under conditions of 80° C.×1 hr+120×2 hrs. After curing, the resulting FRP was released from the mold and cut into a predetermined size. The resulting FRP piece was subjected to post curing at 150° C. for 4 hours and then, provided as a sample.

It has been confirmed that the modulus of elasticity of the FRP thus obtained showed about a 20 to 40 times change with the Tg (about 95° C.) as a boundary, suggesting the possibility of shape fixity.

The FRP was evaluated for shape fixity and shape recovery. The FRP test piece was placed in a heater of about 150° C. (Tg+55° C.) for about 5 minutes and just after that, it was fitted completely to a jig heated to about 150° C.

From the heater, the test piece fitted to the jig was taken out and dipped in water of about 40° C. (Tg−55° C.) for 5 minutes. After it was taken out from the water, the test piece was released from the jig. After the test piece was allowed to stand for 30 seconds, the shape of it was traced.

Again, the test piece was placed in a heating chamber of about 150° C. for about 5 minutes, taken out therefrom and dipped in water of about 40° C. for 5 minutes. The shape of the test piece was traced.

As a result, TP2 and TP3 both showed excellent shape memory properties, for example, at least 99% in shape fixity and about 100% in shape recovery.

What is claimed is:

1. A fiber reinforced plastic comprising:
a cured thermoset shape memory polymer, a composition thereof consisting of an isocyanate which is a mixture consisting of bifunctional and trifunctional isocyanates and a polyol, and optionally a component selected from the group consisting of a filler and a diluent, with a molar ratio in terms of functional groups of the isocyanate: the polyol=0.9 to 1.1:1.0 and the isocyanate being liquid at room temperature,
wherein the polyol (i) consists of at least one bifunctional polyol having an average molecular weight of from 100 to 250 and (ii) does not comprise a chain extender; and
wherein the cured thermoset shape memory polymer has a glass transition point (Tg) of 70 to 150° C.; and a fibrous material in the cured thermoset shape memory polymer.

2. The fiber reinforced plastic according to claim 1, which contains 25 to 95 vol. % of the thermoset shape memory polymer composition and 5 to 75 vol. % of the fibrous material.

3. A production process of a fiber reinforced plastic, which comprises:

mixing an isocyanate that is liquid at room temperature and a polyol at room temperature, with a molar ratio in terms of functional groups of the isocyanate:the polyol=0.9 to 1.1:1.0 to prepare a matrix resin having a composition consisting of the liquid isocyanate and the polyol, and optionally a component selected from the group consisting of a filler and a diluent and having a pot life of at least 30 minutes, the pot life being a rise in temperature necessary for the polymer composition to attain a viscosity of about 1000 cps, wherein the polyol (i) consists of at least one bifunctional polyol having an average molecular weight of from 100 to 250 and (ii) does not comprise a chain extender, and wherein the liquid isocyanate is a mixture consisting of bifunctional and trifunctional isocyanates;

impregnating a fibrous material with the matrix resin of the composition at room temperature; and then curing the impregnated fibrous material and the matrix resin by raising the temperature to transfer the matrix resin into a cured thermoset shape memory polymer having a glass transition point (Tg) of 70 to 150° C.

4. The production process of a fiber reinforced plastic according to claim 3, wherein the polyol contains at least 50 wt. % of polypropylene glycol.

5. The production process of a fiber reinforced plastic according to any one of claims 3 to 4, wherein at least two layers of the impregnated fibrous material were stacked one after another, caused to stick closely each other, pressurized and cured as a laminate having a multilayer structure.

6. The fiber reinforced plastic according to claim 1, wherein the polyol contains at least 50 wt. % of polypropylene glycol.

7. The production process of a fiber reinforced plastic according to claim 3, which contains 25 to 95 vol. % of the thermoset shape memory polymer composition and 5 to 75 vol. % of the fibrous material.

8. The production process according to claim 3, wherein the fibrous material with a matrix resin of the composition is molded by a resin transfer molding.

9. The fiber reinforced plastic according to claim 1, wherein the average molecular weight is from 150 to 250 and the Tg is from 70 to 120° C.

10. The production process according to claim 3, wherein the average molecular weight is from 150 to 250 and the Tg is from 70 to 120° C.

* * * * *